Patented Feb. 7, 1933

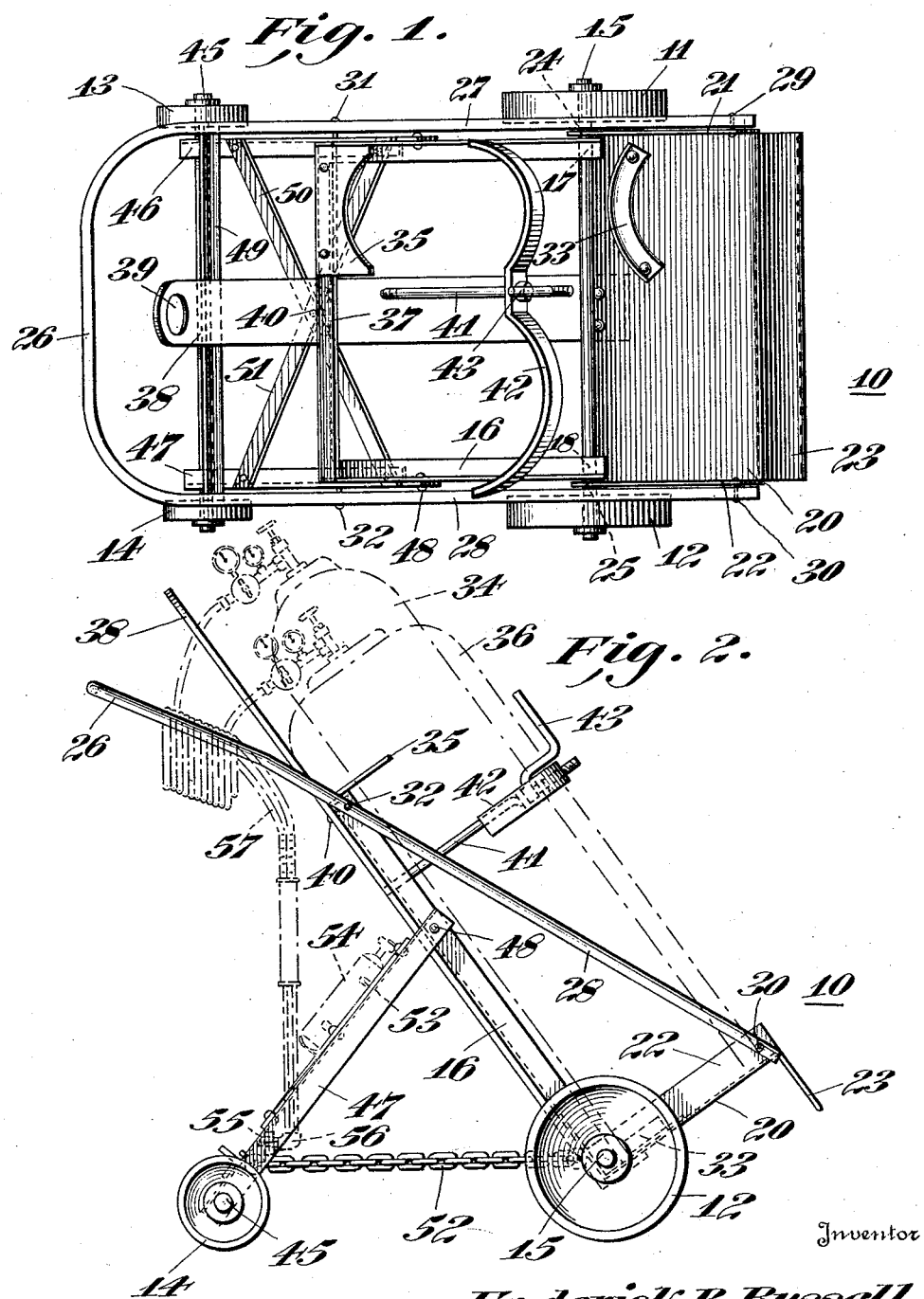

1,896,249

UNITED STATES PATENT OFFICE

FREDERICK B. RUSSELL, OF COATESVILLE, PENNSYLVANIA, ASSIGNOR TO BETHLEHEM STEEL COMPANY, A CORPORATION OF PENNSYLVANIA

CARRIER

Application filed December 14, 1929. Serial No. 414,127.

My invention relates to carriers and particularly to carriers for portable gas welding and cutting equipment.

The primary object of this invention is to provide a carrier for tanks which is capable of assuming a vertical position when the tanks thereon are in use so that the truck will take up a very small amount of floor space.

A further object of this invention is to provide a carrier with auxiliary wheels which are adapted to support part of the load of the carrier when the carrier is being moved from place to place, but which can be folded out of the way when the carrier is at rest in its vertical position.

A still further object of this invention is to provide the carrier with means to which a hoist may easily be attached when it is desired to hoist the carrier and equipment thereon.

The novel features of my invention will be more fully understood from the following description and claims taken with the accompanying drawing in which:

Fig. 1 is a top plan view of my improved carrier when in position to be wheeled.

Fig. 2 is a side view of my carrier with tanks clamped thereon.

Referring to the drawing more in detail, 10 represents a carrier constructed in accordance with my invention having a pair of main wheels 11 and 12 and a pair of auxiliary wheels 13 and 14. The wheels 11 and 12 are mounted in spaced relation on the axle 15. The main frame 16 of the truck comprises a substantially inverted U-shaped member having apertures 17 and 18 in the ends thereof through which the axle 15 is inserted. Extending angularly from the frame 16 is a member 20 which constitutes a platform for the carrier to support the load when the truck is in its vertical position.

This platform 20 preferably comprises a plate having its edges 21 and 22 upturned to provide sides for the platform and its edge 23 turned downwardly to provide a support for the front of the carrier when it is in its vertical position, so as to prevent it from tipping forward.

The sides 21 and 22 are preferably provided at one end with apertures 24 and 25, respectively, through which the axle 15 is inserted for attaching the platform thereto.

An inverted U-shaped tubular member 26 which provides a handle for moving the carrier has the lower ends of its legs 27 and 28 attached to the platform 20 at 29 and 30 respectively. The member 26 is also attached to the frame 16 at 31 and 32 and retains the platform 20 in its proper relation with respect to the frame 16 and also provides strengthening means for the carrier. The platform 20 is provided with a semicircular angle member 33 which is adapted to provide a support for the tank 34. The cross member 37 of the frame 16 is provided with a support 35 which is adapted to receive the upper end of the tank 34. The tank 36 preferably rests directly on the frame 16 and the platform 20.

In certain cases it is desirable to use a hoist to lift the equipment vertically to different places and so as to permit easy handling of the carrier by such a hoist, I provide a lifting bar member 38 which has an eye 39 in its upper end. The member 38 is preferably upturned at its lower end and is fastened by suitable means to the underside of the platform 20. The member 38 is also fastened at 40 to the cross member 37 of the frame 16.

The bar member 38 is also provided with a bolt 41 which is adapted to receive a clamp 42 which is provided to secure the tanks 34 and 36 in place. A threaded bar member 43 is provided for the bolt so as to adjust the clamp and also to retain it in its proper position.

In order that the weight of the tanks may be entirely supported by the carrier when the carrier is tilted towards its horizontal position, that is, when it is in its normal position to be wheeled from place to place, I provide auxiliary wheels 13 and 14 which are mounted on an axle 45. The axle 45 is connected to the frame 16 by supports 46 and 47, which are pivotally connected to the frame 16 by suitable fastening means, such as bolts or rivets 48. The supports 46 and 47 are adapted to fold up against the frame 16 when the carrier is in its vertical position, so that the wheels 13 and 14 will be out of the way when the carrier is in that position.

By referring to Fig. 2 of the drawing it will be noted that the supports 46 and 47 are positioned on the frame 16 sufficiently near the lower end so that the auxiliary wheels will always engage the floor a sufficient distance in the rear of the engagement of the main wheels with the floor even when the carrier is in its vertical position, so that should the carrier be accidentally tipped backward the auxiliary wheels will move away from the main wheels until the carrier is in the position indicated in Fig. 2, whereupon further movement of the auxiliary wheels is prevented due to the chain 52.

The supports are preferably braced by the members 49, 50 and 51. Flexible means, such as chains 52, are provided to limit the distance the auxiliary wheels may be separated from the main wheels so that the upper portion of the carrier may be maintained in its proper position to be wheeled.

A bracket 53 may be provided on one of the supports for the reception of a fire extinguisher 54. A holder 55 is preferably mounted on one of the supports for receiving the torch 56, which is connected to the welding outfit by the hose 57. The hose 57 is preferably looped around the handle 26 when not in use.

It will therefore be understood from the above that I have devised a novel carrier which is useful for various purposes and which is especially adaptable for welding and cutting equipment.

While I have shown my invention in but one form it will be obvious to those skilled in the art that it is not so limited, but is susceptible of various other changes and modifications without departing from the spirit thereof, and I desire therefore that only such limitations shall be placed thereupon as are imposed by the prior art, or as are specifically set forth in the appended claims.

Having thus described my invention what I claim as new and desire to secure by Letters Patent is:

1. A carrier comprising a frame, a platform operatively connected to the lower portion of said frame, a pair of main wheels mounted on an axle connected to the lower portion of the frame, a pair of auxiliary wheels for said carrier and supports for said auxiliary wheels pivotally mounted on the carrier frame at a less distance from the lower end of the carrier than the length of the supports so as to automatically move towards the main wheels upon the carrier assuming a vertical position and away from said main wheels upon the tendency of the carrier to assume a horizontal position, and means continuously effective for arresting the separation of said auxliary wheels a definite distance from the main wheels, whereby the carrier is continuously prevented from accidentally assuming a horizontal position.

2. A carrier comprising a frame of substantially U-shaped formation, a platform connected to said frame, a wheeled axle connecting the legs of the frame and the platform together, brace members connected to the outer end of the platform and the upper ends of the frame, a substantially U-shaped handle member extending beyond the aforementioned frame and integral with said brace members, and wheeled supports pivotally attached to the frame.

3. A carrier comprising a frame of substantially U-shaped formation, a platform connected to said frame, a wheeled axle connecting the legs of the frame and the platform together, brace members connected to the outer end of the platform and the upper ends of the frame, a substantially U-shaped handle member extending beyond the aforementioned frame and integral with said brace members, wheeled supports pivotally attached to the frame and flexible means attached to the supports and the lower end of the frame for limiting the movement of the supports with reference to the lower end of the frame.

4. A carrier comprising a frame of substantially U-shaped formation, a platform mounted in angular relation with said frame, a wheeled axle passing through the lower end of the frame and the platform and providing the sole connection between the lower end of the frame and the platform, and means for connecting the upper end of the frame and the outer portion of the platform.

5. A carrier comprising a frame of substantially U-shaped formation, a platform mounted in angular relation with said frame, a wheeled axle providing the sole connecting means between the lower end of the frame and the platform and an inverted U-shaped handle member attached to the upper portion of the frame and the outer portion of the platform.

6. A carrier comprising a frame member of substantially U-shaped formation having apertures therein adjacent its open ends, an axle passed through said apertures, a platform mounted on said axle in angular relation with the frame, a substantially U-shaped handle member having its legs connected at their lower extremities to the outer portion of the platform and having the intermediate portions of its legs connected to the upper portion of the frame member, and supporting means for the upper portion of the carrier when it is in its normally movable position.

7. A carrier for a welding outfit comprising a frame and a platform adapted to support the tanks of said outfit, a substantially U-shaped handle member having its legs extending obliquely to said frame and said platform and connected thereto to provide strengthening members for said platform, and a lifting bar having its lower portion connected to the platform and its intermediate portion connected to the upper portion of the aforementioned frame, said lifting bar having an eye in its upper end.

In testimony whereof I hereunto affix my signature.

FREDERICK B. RUSSELL.